No. 749,349. PATENTED JAN. 12, 1904.
W. J. WRIGHT.
REVERSING CLUTCH MECHANISM.
APPLICATION FILED MAR. 24, 1903.
NO MODEL. 2 SHEETS—SHEET 1.
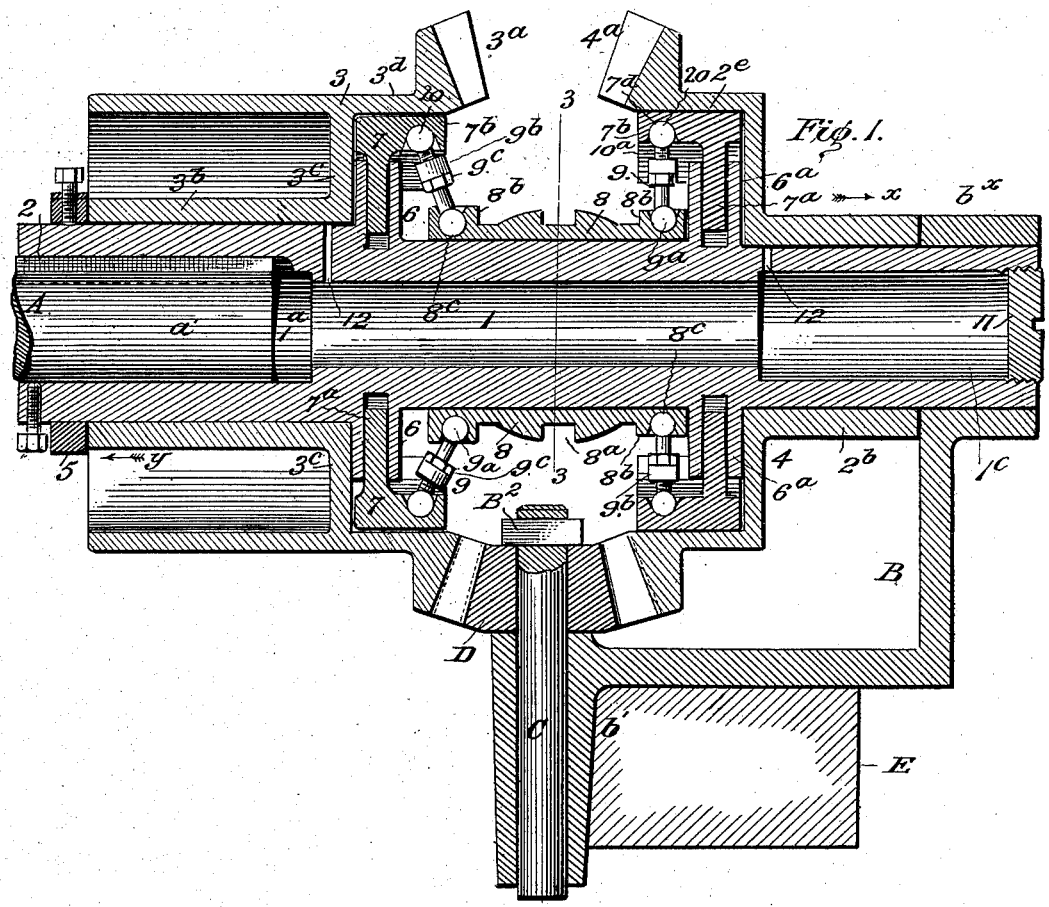
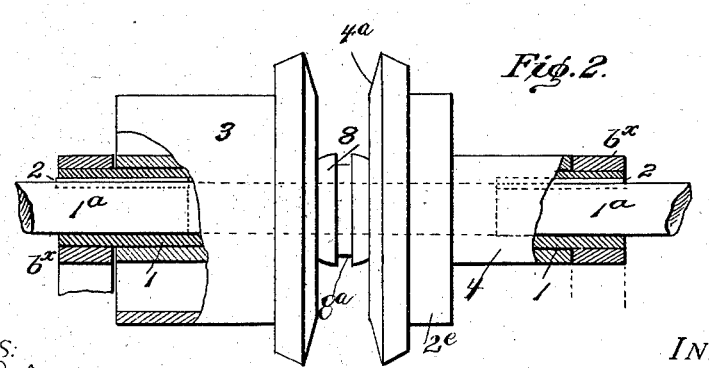
WITNESSES:
John T. Schrott
Louis Dieterich
INVENTOR
William J. Wright
BY
Fred G. Dieterich & Co
Attorneys

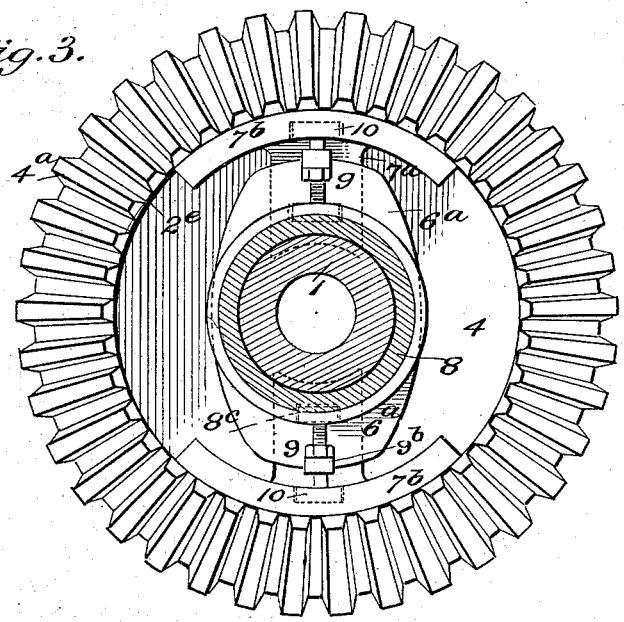
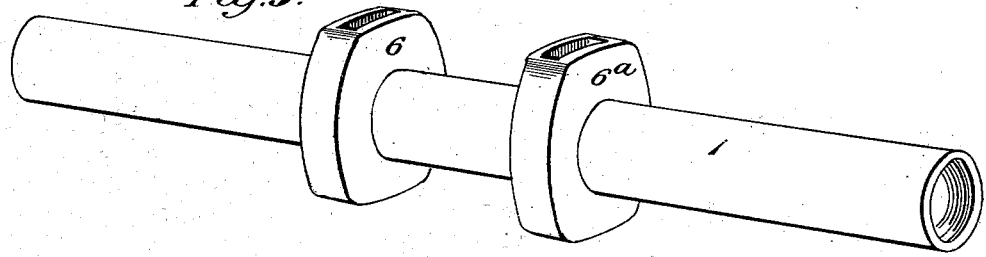
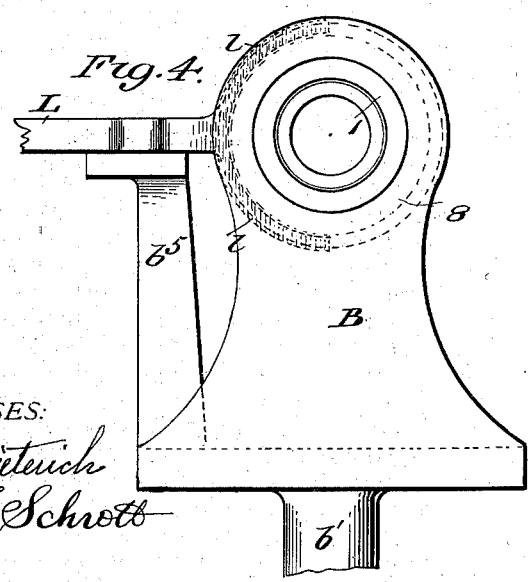

No. 749,349.                                                   Patented January 12, 1904.

UNITED STATES PATENT OFFICE.

WILLIAM J. WRIGHT, OF PITTSBURG, PENNSYLVANIA, ASSIGNOR, BY DIRECT AND MESNE ASSIGNMENTS, TO THE WRIGHT REVERSE COMPANY, OF PITTSBURG, PENNSYLVANIA, A CORPORATION OF WEST VIRGINIA.

REVERSING-CLUTCH MECHANISM.

SPECIFICATION forming part of Letters Patent No. 749,349, dated January 12, 1904.

Application filed March 24, 1903. Serial No. 149,319. (No model.)

*To all whom it may concern:*

Be it known that I, WILLIAM J. WRIGHT, residing at Pittsburg, in the county of Allegheny and State of Pennsylvania, have invented a new and Improved Reversing-Clutch Mechanism, of which the following is a specification.

My invention comprehends certain new and useful improvements in reversing - clutch mechanism more especially adapted for use on the drive-shaft of explosive or other engines for shifting the direction of movement of the belt or driving-gear actuated from the drive-shaft; and it specifically relates to certain modifications and details of a like construction of reversing-clutch mechanism disclosed in my copending application filed on even date with this application, as will hereinafter be more fully described, and specifically pointed out in the appended claims, reference being had to the accompanying drawings, in which—

Figure 1 is a longitudinal section of my improved construction of reversing-clutch mechanism, the same being shown connected to the end of an engine-shaft to form a continuation thereof. Fig. 2 is a similar view, parts being in side elevation, the clutch mechanism being arranged as a jack connection for joining the separated ends of a drive or power shaft. Fig. 3 is a transverse section of the same on the line 3 3 of Fig. 1. Fig. 4 is an end elevation of the same looking in the direction of the arrow in Fig. 1. Fig. 5 is a detail perspective view of the sleeve or tubular-shaft member hereinafter specifically referred to.

When arranged as shown in Fig. 1, my improved construction of clutch mechanism has one end connected to and bears upon the end $a'$ of the engine-shaft, and at the opposite end it has a bearing in a journal formed on an L-shaped bracket B, which is provided with a pendent hub $b'$ to receive the stud-shaft C, upon which is loosely mounted an idler or intermediate cog-gear D, hereinafter again referred to, and the said bracket B also forms a means for holding the clutch-gear devices or pulleys from lateral play in the outward direction, (see arrow $x$,) the reason for which will hereinafter appear, and the bracket B is rigidly supported on a beam E, as clearly shown in Fig. 1.

The clutch mechanism proper comprises a tubular sleeve 1, one end of which is cored out, as at $1^a$, to receive the end $a'$ of the engine-shaft A and is made fast thereto to turn therewith by a key 2.

When utilized in the manner illustrated in Fig. 1, the member 1 forms a tubular extension on the shaft A, and the same is of a sufficient length to receive all of the clutch devices, which comprise a combined belt and clutch-gear 3, which on account of the maximum draft strain being thereon is mounted on that end of the tubular sleeve 1 that receives the end $a'$ of the shaft A, the opposing clutch gear or pulley 4 being mounted on the outer end of the said tubular sleeve 1, with its annular gear-rim $4^a$ facing the gear-rim $3^a$ of the pulley 3.

The gear-pulley 3 has a long hub $3^b$, which extends outward from and merges with the web or disk portion $3^c$, and the said hub $3^b$ engages with a collar 5, fixedly held on the inner end of the sleeve 1, which collar holds the pulley 3 from lateral play on the sleeve 1 in the direction of the arrow $y$, and the said pulley 3, which is loosely mounted on the shaft 1, is held from loose play in the opposite direction by reason of its disk portion $3^c$ engaging the adjacent set of clutch-shoe receiving-pockets 6 6, integral with and projected radially from the sleeve 1, the peculiar construction of which and the detail combination of the same with the parts that coöperate therewith forming an essential feature of my present invention.

By referring now more particularly to Fig. 1 it will be noticed the pulley-gear 3 has an annular clutch-flange $3^d$, that projects over the pockets 6 6 and the shoes 7 7, the latter being radially adjustable in the pockets 6 6, and the end of the flange 3$^d$ merges with the gear-rim 3$^a$, the teeth of which and the rim 4$^a$ are of suitable pitch to properly mesh with the idler-gear D, which is held in a proper horizontal position by reason of seating on the bracket-hub $b'$ and the key attached to the shaft C.

The clutch-pulley 4 has an outwardly-projecting hub 2$^b$, that engages the bracket portion $b^x$, and the said pulley is loosely mounted on the sleeve 1 and held from inward lateral movement by reason of its web or disk portion engaging with the shoe-pockets 6$^a$, formed on the stem 1 in a manner similar to the pockets 6 6, and the said clutch or pulley 4 is also formed with an annular clutch-flange 2$^e$, that projects over its coöperating clutch-shoes and their holding-pockets. The flanges 2$^e$ merge with the gear-rim 4$^a$, as shown.

The pockets 6 6$^a$ are in the nature of transverse enlargements integral with the sleeve 1 and which are cored out at diametrically opposite points to receive the shank 7$^a$ of the clutch-shoe 7, and the shank-receiving pockets 6 6$^a$ have parallel sides of suitable thickness to properly guide the said clutch-shoe shanks 7$^a$ and to provide sufficient thickness of metal at the said portions of the sleeve 1 to withstand the strain that is transmitted directly from the said sleeve 1 to the loosely-mounted pulleys 2 and 3 through the medium of the clutch-shoes 7. The shanks 7$^a$ of each of the clutch-shoes are slidable in the radially-disposed pockets and mesh with segmental clutch members 7$^b$, the gripping-faces of which are concentric with the clutch-flanges of the pulleys or gears 2 and 3, as clearly shown in Fig. 3.

That portion of the sleeve 1 that carries the pockets 6 6$^a$ is thickened to give additional strength to the said part of the sleeve 1, and upon the said thickened portion is mounted the shiftable clutch-sleeve 8, which has a centrally-disposed annular groove 8$^a$ to receive the bifurcated ends $l$ of the clutch-lever L, which is horizontally mounted on a vertical extension $b^5$ of the bracket B, (see Fig. 4,) and the opposite ends of the clutch-sleeve 8 have annular enlargements 8$^b$ 8$^b$, which at diametrically opposite points have semicircular bearings 8$^c$ 8$^c$ to accommodate the circular heads 9$^a$ 9$^a$ of the clutch-links 9 9, which include the adjusting-nuts 9$^c$ and coupling-blocks 9$^b$ and with the latter of which join the screw-shanks 10$^a$ of the heads 10, that engage semicircular sockets 7$^d$ 7$^d$ in the inner faces of the shoe members, as shown.

The hollow of the sleeve 1 when my mechanism is designed for use, as shown in Fig. 1, is utilized as a lubricant-holder and can be readily filled through the outer end 1$^c$, which is normally closed by a screw-plug 11, and the sleeve 1 has oil-passages 12 12 to distribute the oil and maintain an efficient lubrication of the bearing parts.

While my present form of clutch mechanism is more especially designed to be attached to the end of an engine-shaft, it is manifest the same can be utilized as a jack-shaft for joining the adjacent ends of two drive-shaft connections, as shown in Fig. 2, and in the latter arrangement the plug 11 is omitted, and the end 1$^c$ of the sleeve is cored out similar to the opposite end that receives the shaft-section $a'$ (shown in Fig. 1) and keyed to its respective shaft end in the same manner.

By reason of the peculiar construction of the parts, as described and shown, a compact, strong, and effectively-operating reversing mechanism is provided in which the operation of reversing can be quickly accomplished without any appreciable torsional or twist strain on the operating parts, and since the connection between the pulleys and the sleeve 1 is made direct through the shoes having rigid adjustment with respect to the sleeve 1 and interlock therewith from lateral motion and engaging with a reinforced part of the sleeve a strong connection between the sleeve and the loosely-mounted gear-pulleys is provided without the use of the usual feather connection joining the sliding clutch-sleeve with the tubular sleeve or shaft extension.

Having thus described my invention, what I claim, and desire to secure by Letters Patent, is—

1. In a reversing-clutch mechanism of the character described; the combination with a stationarily-held bearing and a suitably-supported idler-gear; of a shaft-section supported at one end on the stationary bearing, its other end being arranged to couple with the end of an engine-shaft, a pair of opposing gear-pulleys loosely mounted on the aforesaid shaft-section and having opposing gear-rims to mesh with the idler-gear, the said gear-pulleys each having an inwardly-extended annular clutch-flange, the said shaft-section having radially-projected integral pockets at points in transverse alinement with the clutch-flanges on the loose pulleys, clutch-shoes having gripping-faces concentric with the clutch-flanges on the pulley-gears, said clutch-shoes having stems radially adjustable within the aforesaid pockets, and means mounted on the shaft-section intermediate the pockets thereon for alternately shifting the clutch-shoes to a gripping or a released position, as set forth.

2. In a clutch mechanism of the character described; the combination with the tubular member 1, adapted to be fixedly coupled to the end of an engine-shaft and form an extension thereof, the L-shaped bracket B having a bearing for the outer end of the shaft extension 1, a hub $b$ and an upwardly-extending member $b^5$ disposed midway the shaft extension 1, an idler-gear, a stud-shaft therefor mounted in the pendent bracket-hub $b$, the pulleys 2 and 3 loosely mounted on the shaft extension, each pulley having a gear-rim for engaging with the idler-gear and an annular clutch-flange, clutch-shoes secured to the shaft extension having radial adjustment thereon, said shoes each having a portion concentric with the clutch-flanges on the gear-pulleys, a clutch-actuating sleeve loosely mounted and endwise slidable on the shaft extension, said sleeve having a central annular groove, a shifting-lever joined on the central upwardly-extended bracket member and engaging the annular grooves in the clutch-sleeve, and toggle-link connections joining the said sleeve and the sliding clutch-sleeve, all being arranged substantially as shown and for the purposes described.

WM. J. WRIGHT.

Witnesses:
　C. V. BOYER,
　C. C. DUFFIED.